June 14, 1932. F. STONE Re. 18,500

CORE DRILL

Original Filed Aug. 19, 1924

Inventor
Frederick Stone.

James T. Burke
Attorney.

Reissued June 14, 1932

Re. 18,500

UNITED STATES PATENT OFFICE

FREDERICK STONE, OF LOS ANGELES, CALIFORNIA, ASSIGNOR TO DOHENY-STONE DRILL CO., OF LOS ANGELES, CALIFORNIA, A CORPORATION OF DELAWARE

CORE DRILL

Original No. 1,720,700, dated July 16, 1929, Serial No. 732,981, filed August 19, 1924. Application for reissue filed December 15, 1930. Serial No. 502,573.

My invention relates to improvements in rotary drilling equipment and machinery for drilling or boring into the earth and retaining a core or sample of the mineral or earth drilled through and consists of any or all of the devices herein described.

The objects of the invention are: first, to provide a device for both washing out the hole previously drilled, or partly drilled, and preserving and removing a core or sample of the mineral or earth drilled through; second, to provide a cutting bit so designed as to permit the circulating fluid to pass through its walls to, and across its face; third, to provide devices for retaining samples or core of the mineral or earth drilled through. It is an especial object of my invention to provide a device in which the liquid is carried through ports separated from the core until a point very close to the bottom of the hole is reached when it is guided in such a way as to carry all débris outward away from the core.

Figure 4:
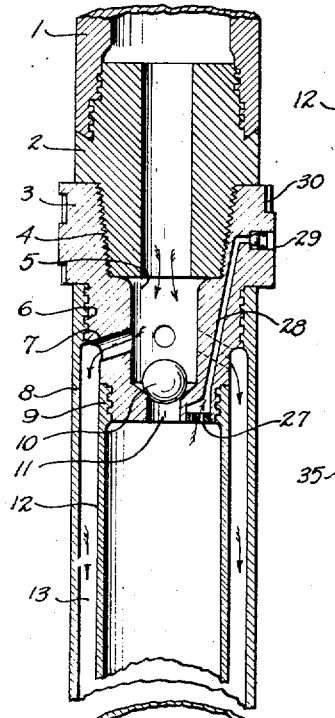
Figure 4:
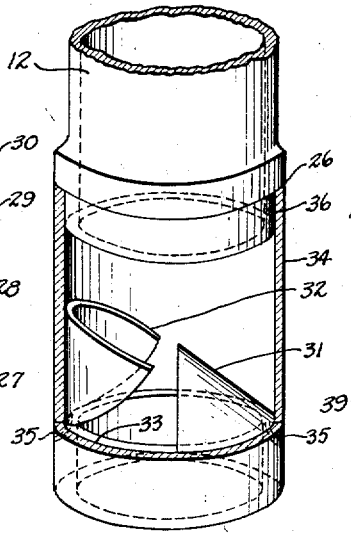
Figure 5:
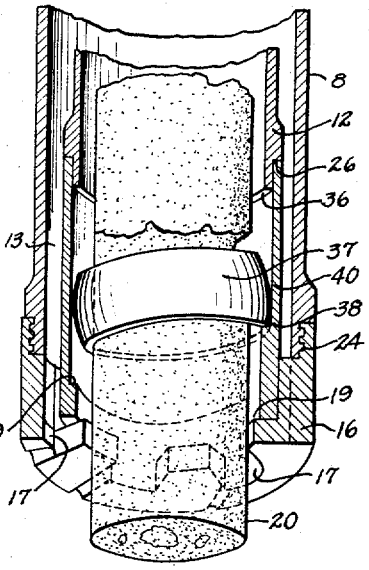
Figure 1:
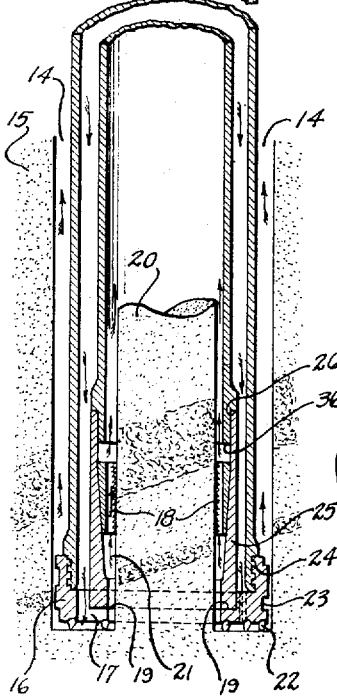
Figure 2:
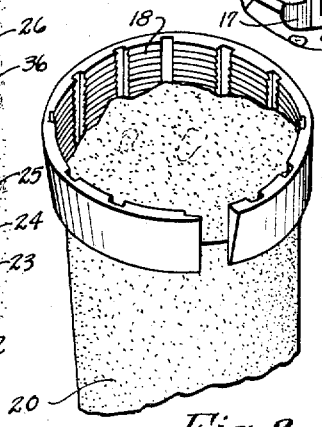
Figure 3:
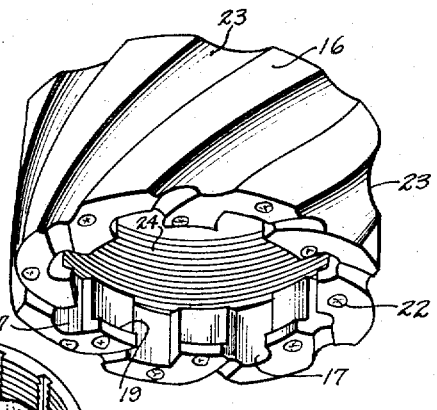

I attain these objects by use of the device illustrated in the accompanying drawing, in which:

Figure 1 is a vertical section assembly of a double-tube core barrel, a core retaining device and a cutting bit;

Fig. 2, an enlarged perspective view of a tapered split ring core retaining device;

Fig. 3, an enlarged perspective view of a cutting bit of my design;

Figs. 4 and 5 are enlarged vertical perspective sections of novel types of core retaining devices, both of which may be substituted for the core retaining device shown in connection with the core barrel illustrated in Fig. 1.

The term "shell" used in the following specifications and claims is to be construed to mean a tubular member forming a part of, and enclosing, the core retaining device.

In the several views similar numerals refer to similar parts.

1 is the continuation of the drill pipe or hollow rods to which the core barrel is attached and by which it is rotated. 2 is a coupling intervening between the drill pipe or hollow rod and the core barrel head 3, to which it is attached by means of threads 4. 7 indicates several ports provided for conducting the circulating fluid from chamber 5, formed by the tubular construction of head 3, to the concentric, annular space 13 between the outer tube 8 and the inner tube 12 of the core barrel, both of which tubes are connected to head 3 by means of threads 6 and 9 respectively. 11 is a port provided for the passage of the circulating fluid from chamber 5 to the inner tube 12. 10 is a ball valve for closing port 11 and diverting the circulating fluid through ports 7. 15 is the earth or mineral through which the hole is being drilled. 16 is a cutting bit having inside flutes 17 and outside flutes 23 and cutting agents 22 (diamonds in the present instance), said bit being attached to the outer tube 8 by means of threads 24. 18 is a tapered split ring retained in an annular tapered recess 21 formed in the shell 25, the latter being joined to inner tube 12 by slip joint 36 and held in place by shoulder 26 on the inner tube 12 and shoulder or bars 19 of the cutting bit 16. If during drilling operations the split ring 18 should catch or bind on the core 20, it will ordinarily remain stationary with the core, but should it not, the slip joint 36 will allow the shell 25 to remain stationary, thereby obviating likelihood of damage to either the core or core lifter. 27 is a screen; 28, a port or passage; and 29 a check valve, all provided for the escape of circulating fluid from inner tube 12 while the same is being filled with core 20. 23 and 30 are spiral flutes in the cutting bit 16 and head 3, respectively, provided for the upward passage of the circulating fluid.

The operation of the core barrel and its attached devices, illustrated in Fig. 1, is as follows: The core barrel is first assembled with ball 10 removed and is lowered into the hole attached by means of coupling 2 to as many lengths of drill pipe or hollow rods 1 as may be necessary to bring the cutting bit 16 nearly to the bottom. The circulating fluid is applied under pressure through the drill pipe or hollow rods 1 and forced directly through the head 3 and port 11, into the inner tube 12, thence through the cutting bit 16 into the hole and back to the surface of the earth, washing the hole clear of débris. The core barrel is then lowered until the cutting bit 16 has reached its drilling position and ball 10 is dropped through the drill pipe or hollow rods 1, closing port 11. The circulating fluid is again applied under pressure and a rotary motion given to the drill pipe or hollow rods and the core barrel and cutting bit. The presence of ball 10 in port 11 causes the circulating fluid to pass through ports 7 into space or fluid circulation way 13, thence through the inside flutes 17 in bit 16 and across the face of the bit, cooling it at the points most liable to damage from heating, at the same time clearing away all cuttings from the face of the bit. The circulating fluid carrying the cuttings is forced through the outside flutes 23, space 14, between the outer tube 8 and the surrounding earth 15, through outside spiral flutes 30 in head 3 and thence to the surface of the earth. It will be observed that the circulating fluid during its downward passage in the core barrel does not come in contact with the core as it does in core barrels heretofore used in which the circulating fluid passes directly along the core for at least a part of its length. Any of the circulating fluid finding its way into inner tube 12 from the face of the bit 16 is expelled through screen 27, passage 28 and check valve 29 as the core advances into said tube. When the inner tube 12 is filled with core, the rotation is stopped and the core barrel raised. The upward motion of the core barrel draws the tapered shell 25 up over the tapered ring 18, contracting said ring which in turn clamps the core and holds it until it is removed at the surface of the earth.

The core retaining device shown in Fig. 4 is novel as hereinafter claimed and is also for use in the core barrel illustrated in Fig. 1. 34 is the shell (given a new number because its design differs from that of shell 25 above described) connected to inner tube 12 by slip joint 36 and is held in place in the core barrel in the same manner as that of shell 25. The device has two wings or valves of which 32 is one, shown in full perspective tipped back against the wall of shell 34 illustrating the position taken by both wings or valves when open. 31 is the other wing or valve indicating the position taken by both when closed. The wings or valves 31 and 32 are hinged to shell 34 at 35 so that they will open concentrically against the inner wall of the shell 34 for the reception of core or other objects, and close on shoulder 33 to prevent the loss of the same. When open, the wings or valves will permit the reception of any objects that will pass through the orifice formed by shoulder 33, and when closed, they will prevent the loss of any object, however small, contained in the device. The principal use of this core retaining device is for recovering fragments of core, samples of mud and sand, foreign objects and anything that could not be held in open types of core retaining devices. It differs from the core retaining devices heretofore used in that it will receive and retain both minute and large objects with equal facility. This device may also be used as a bailer with a churn drill or as a foot valve on a pump.

Fig. 5 illustrates a modification of the core retaining device shown in connection with the core barrel and is for use with a core barrel. The outstanding feature in the construction of this device is a solid ring supported at one point so that by any upward motion of the core barrel or downward motion of the core a pivotal action is imparted to the ring, altering its vertical axis from that of the encircled core and bringing the edges of the ring in contact with the core, with the result that the core is fractured and clamped in the shell. This device is particularly useful when drilling large diameter holes and when the resulting core is not easily broken loose from the surrounding rock. 37 is an unbroken ring with rounded sides to permit tipping. 40 is the shell (given a new number because its construction differs from that of the previously described shells) connected with inner tube 12 by slip joint 36 and held in place in the core barrel in the same manner as that described above for shells 25 and 34. 39 is a shoulder forming a part of shell 40 and having a high point 38 for tipping the ring 37 as described above.

Having thus described my invention, I claim:

1. The combination in rotary drills and equipment for drilling or boring into the earth, of a double tube core barrel for taking samples or core of the mineral or earth, drilled through, said tubes of the core barrel having a fixed position relative to each other for simultaneous rotation, the inner tube of the core barrel having a recessed portion, a free turning shell loosely mounted on the recessed portion of the inner tube of the core barrel, a core retainer carried by the free turning shell, a cutting bit sub-joined on the outer core barrel said cutting bit having inwardly extending flanges on which the aforesaid free turning shell is supported for free turning movement.

2. The combination in rotary drills and equipment for drilling or boring into the earth of a double tube core barrel for taking samples or core of the mineral or earth drilled through, a common head to which the tubes of the core barrel are affixed for simultaneous rotative movement, a cutting bit sub-joined to the outer tube of the double tube core barrel, said cutting bit having spaced horizontal inwardly extending flanges, the double tube core barrel having an annular channel between its tubes throughout their length to the cutting bit to permit of the free flow of water to the face of the cutting bit, a free turning shell supported on the inwardly extending flanges of the cutting bit for free turning movement independent both of the bit and of the inner tube of the core barrel, and a core retainer carried by the free turning shell.

3. In a core drill, the combination of a double tube core barrel, a head to which both tubes of the core barrel are threaded for holding same in fixed spaced relation firmly attached to and rotating with the head, the double tube core barrel having an annular chamber between its tubes, the head having a central passage, and having lateral ports communicating with the aforesaid annular chamber, a shell sub-joined to the inner tube and mounted for free rotative movement relative to the inner tube of the core barrel, said shell having a recessed portion, a core retaining device confined in the recess formed in said shell, and a cutting bit mounted on the outer core barrel and having flanges positioned to loosely support the aforesaid free turning shell.

4. The combination in rotary drills and equipment for drilling or boring into the earth, of a double tube core barrel for taking samples or core of the mineral or earth drilled through, a head on which the tubes of the core barrel are affixed, said head having channels opening into the annular space between the respective tubes, and having a valve in its head by which the flow of the circulating fluid may be directed either into the inner tube or into the annular space between the inner tube and the outer tube and then directly to the face of the cutting bit, a freely rotatable shell supported on the cutting bit and having its upper end in contact with the lower end of the inner tube, said free turning shell carrying a core engaging element, a cutting bit affixed to the outer tube of said core barrel, said cutting bit having passages on its cutting face and having spiral grooves on its outer walls communicating with said first mentioned passages for conducting the circulating fluid directly across its cutting face.

FREDERICK STONE.